United States Patent
Bala et al.

(10) Patent No.: US 9,356,536 B2
(45) Date of Patent: May 31, 2016

(54) BIDIRECTIONAL POWER CONVERSION WITH FAULT-HANDLING CAPABILITY

(71) Applicant: ABB Research Ltd., Zurich (CH)

(72) Inventors: Sandeep Bala, Raleigh, NC (US); Joseph A. Carr, Cary, NC (US)

(73) Assignee: ABBI Research Ltd., Zurich (CH)

( * ) Notice: Subject to any disclaimer, the term of this patent is extended or adjusted under 35 U.S.C. 154(b) by 321 days.

(21) Appl. No.: 13/739,517

(22) Filed: Jan. 11, 2013

(65) Prior Publication Data

US 2014/0198533 A1 Jul. 17, 2014

(51) Int. Cl.
*H02M 1/32* (2007.01)
*H02M 7/483* (2007.01)
*H02M 7/487* (2007.01)

(52) U.S. Cl.
CPC .............. *H02M 7/483* (2013.01); *H02M 1/32* (2013.01); *H02M 7/487* (2013.01); *H02M 2001/325* (2013.01); *H02M 2007/4835* (2013.01); *Y02B 70/126* (2013.01)

(58) Field of Classification Search
CPC .................................................. H02M 3/33507
See application file for complete search history.

(56) References Cited

U.S. PATENT DOCUMENTS

| | | | | |
|---|---|---|---|---|
| 4,734,626 A * | 3/1988 | Sutrina | ........... | B60L 15/2054 290/4 R |
| 5,656,915 A * | 8/1997 | Eaves | ........... | 320/118 |
| 5,815,388 A * | 9/1998 | Manley et al. | ........... | 363/63 |
| 6,314,009 B1 * | 11/2001 | Dittmer | ........... | H02J 1/102 363/65 |
| 2004/0062059 A1 * | 4/2004 | Cheng | ........... | B60L 11/1814 363/17 |
| 2005/0286268 A1 * | 12/2005 | Teichmann | ........... | 363/16 |
| 2009/0196082 A1 * | 8/2009 | Mazumder et al. | ........... | 363/132 |
| 2010/0237840 A1 * | 9/2010 | Walter et al. | ........... | 323/282 |
| 2011/0198936 A1 * | 8/2011 | Graovac | ........... | H02M 7/79 307/82 |

(Continued)

FOREIGN PATENT DOCUMENTS

| | | | | |
|---|---|---|---|---|
| DE | 4342414 A1 * | 6/1995 | ........ | H02M 3/33584 |
| EP | 1914162 A1 | 4/2008 | | |
| GB | WO 2011124258 A1 * | 10/2011 | ................ | H02J 3/36 |

(Continued)

OTHER PUBLICATIONS

Bernard Grob, Mitchel E. Schultz; Basic Electronics; 2003 by The McGraw-Hill Companies, Inc.; 9th edition; p. 81-82.*

(Continued)

*Primary Examiner* — Timothy J Dole
*Assistant Examiner* — Bryan R Perez
(74) *Attorney, Agent, or Firm* — Taft Stettinius & Hollister LLP

(57) ABSTRACT

A power conversion system includes a unipolar bidirectional power converter with DC terminals and a first controller, and a bipolar bidirectional power converter with DC terminals connected in series with the DC terminals of the unipolar bidirectional power converter and a second controller. The first controller is operable to cause only a positive-valued DC voltage across the DC terminals. The second controller is operable to cause a positive-valued or negative-valued DC voltage across the DC terminals of the bipolar bidirectional power converter so that a total voltage of the power conversion system is the sum of the positive-valued or negative-valued DC voltage across the DC terminals of the bipolar bidirectional power converter and the positive-valued DC voltage across the DC terminals of the unipolar bidirectional power converter.

18 Claims, 19 Drawing Sheets

(56) References Cited

U.S. PATENT DOCUMENTS

2011/0317452 A1* 12/2011 Anguelov et al. .......... 363/21.02
2013/0208521 A1*  8/2013 Trainer ..................... H02J 3/36
                                                     363/126

FOREIGN PATENT DOCUMENTS

| WO | 2009149743 | A1 | 12/2009 |
|----|------------|----|---------|
| WO | 2011012171 | A1 | 2/2011  |
| WO | 2011012174 | A1 | 2/2011  |
| WO | 2011042050 | A1 | 4/2011  |
| WO | 2011124258 | A1 | 10/2011 |
| WO | 2011124260 | A1 | 10/2011 |
| WO | 2011134521 | A1 | 11/2011 |
| WO | 2012041380 | A1 | 4/2012  |
| WO | 2012103936 | A1 | 8/2012  |

OTHER PUBLICATIONS

Loddick, Sean. "DC technologies for reducing total cost of ownership of offshore wind power." Offshore Wind Technology Conference, Session 3: HVDC Innovations. Dec. 12, 2011, Birmingham. Available online at http://tv.theiet.org/technology/power/12478.cfm.

Merlin, M. M. C. et al., "A New Hybrid Multi-Level Voltage-Source Converter with DC Fault Blocking Capability", 9th IET International Conference on AC and CD Power Transmission, London, UK, Oct. 19-21, 2010, pp. 1-5.

* cited by examiner

BIDIRECTIONAL POWER CONVERSION WITH FAULT-HANDLING CAPABILITY

TECHNICAL FIELD

The instant application relates to power conversion, and more particularly to bidirectional power conversion.

BACKGROUND

Energy feeding a fault on a DC bus or a DC grid should be controlled/limited as quickly and cost effectively as possible. All energy sources connected to the DC bus or DC grid in question have power electronic converter interfaces, and the DC voltage on the DC bus or DC grid is typically at a medium or high voltage level. DC fault current can be reduced by using a thyristor or diode based main rectifier aided by an IGBT (insulated gate bipolar transistor) based active power filter that controls the AC and/or DC side voltages. Alternatively, a DC-side cascade of a thyristor or diode based main rectifier and an IGBT based auxiliary rectifier fed from separate windings of a transformer can be used, where the auxiliary rectifier serves to control the total voltage and reduce the DC fault current. In other examples, a single converter with a main unit and a separate fault handling unit is provided.

However, thyristor and diode bridge-based solutions are only capable of unidirectional power flow. Other approaches use a single large converter made of smaller modules e.g. for high voltage applications, making converter control and module signaling more complex. A more cost-effective, simpler and robust fault-handling solution is desired for medium and high voltage applications.

SUMMARY

The embodiments described herein provide a bidirectional power conversion system that interfaces an AC network and a DC network and has fault current limiting capability.

According to one embodiment of the power conversion system, the system comprises a unipolar bidirectional power converter with DC terminals and a first controller, and a bipolar bidirectional power converter with DC terminals connected in series with the DC terminals of the unipolar bidirectional power converter and a second controller. The first controller is operable to cause only a positive-valued DC voltage across the DC terminals. The second controller is operable to cause a positive-valued or negative-valued DC voltage across the DC terminals of the bipolar bidirectional power converter so that a total voltage of the power conversion system is the sum of the positive-valued or negative-valued DC voltage across the DC terminals of the bipolar bidirectional power converter and the positive-valued DC voltage across the DC terminals of the unipolar bidirectional power converter.

According to an embodiment of a method of operating the power conversion system, the method comprises: outputting only a positive-valued DC voltage across the DC terminals of the unipolar bidirectional power converter under control by the first controller; and outputting a positive-valued or negative-valued DC voltage across the DC terminals of the bipolar bidirectional power converter under control by the second controller so that a total voltage of the power conversion system is the sum of the positive-valued or negative-valued DC voltage across the DC terminals of the bipolar bidirectional power converter and the positive-valued DC voltage across the DC terminals of the unipolar bidirectional power converter.

The second controller can further adjust the positive-valued or negative-valued DC voltage across the DC terminals of the bipolar bidirectional power converter to limit a DC output current of the power conversion system responsive to a DC fault condition or other event. For example, the second controller can reverse the polarity of the voltage across the DC terminals of the bipolar bidirectional power converter so that the total voltage of the power conversion system is forced towards zero when the polarity is reversed.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

The embodiments described herein provide a bidirectional power conversion system that interfaces an AC network and a DC network and has fault current limiting capability. The bidirectional power conversion system comprises a unipolar bidirectional power converter and a bipolar bidirectional power converter. Both power converters are bidirectional in that DC current can flow in either direction. As such, the bidirectional power conversion system can be used as a rectifier or an inverter. A master controller can be provided for coordinating the controllers included in the respective bidirectional power converters. Alternatively, the controllers included in the bidirectional power converters can communicate with each other to implement the power conversion and fault handling techniques described herein.

In each case, the positive-valued or negative-valued DC voltage across the DC terminals of the bipolar bidirectional power converter can be adjusted to limit the DC output current of the power conversion system responsive to a DC fault condition or other event. For example, the bipolar bidirectional power converter included in the power conversion system can reverse the polarity at its DC terminals in response to a DC fault condition. This in turn forces the total voltage of the power conversion system towards zero because the DC terminals of the converters are connected in series, thereby limiting the DC fault current.

Figure 1:
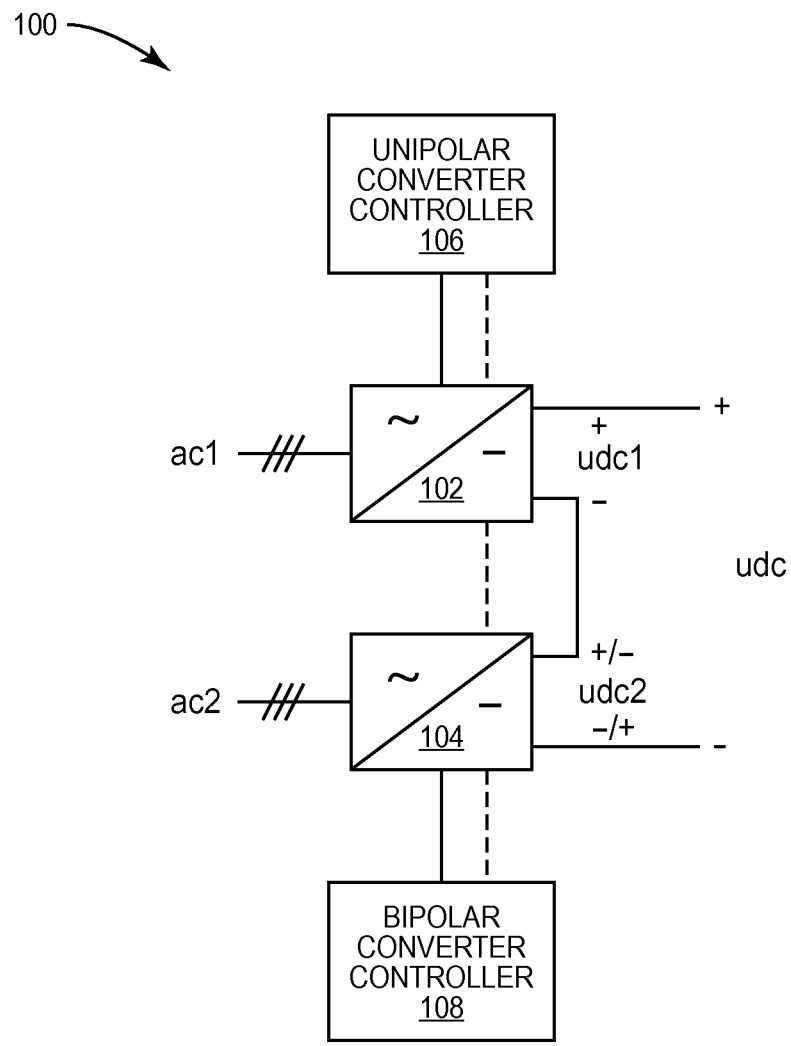
FIG. 1 illustrates a block diagram of an embodiment of a bidirectional power conversion system having fault current limiting capability.

FIG. 1 illustrates an embodiment of a bidirectional power conversion system 100. The system 100 comprises a unipolar bidirectional power converter 102 and a bipolar bidirectional power converter 104. Both converters 102, 104 have AC terminals and DC terminals, respectively. Both converters 102, 104 are bidirectional in that power can flow in either direction. That is, each converter 102, 104 can convert an AC source (ac1, ac2) at the respective AC terminals to DC power at the DC terminals, or convert a DC source (udc) across both sets of DC terminals to AC power at the respective AC terminals. Each converter 102, 104 also has its own dedicated controller 106, 108 for controlling operation of the converters. The controllers 106, 108 can communicate with each other, as indicated by the dashed line in FIG. 1, to implement the power conversion and fault handling techniques described herein.

Figure 2:
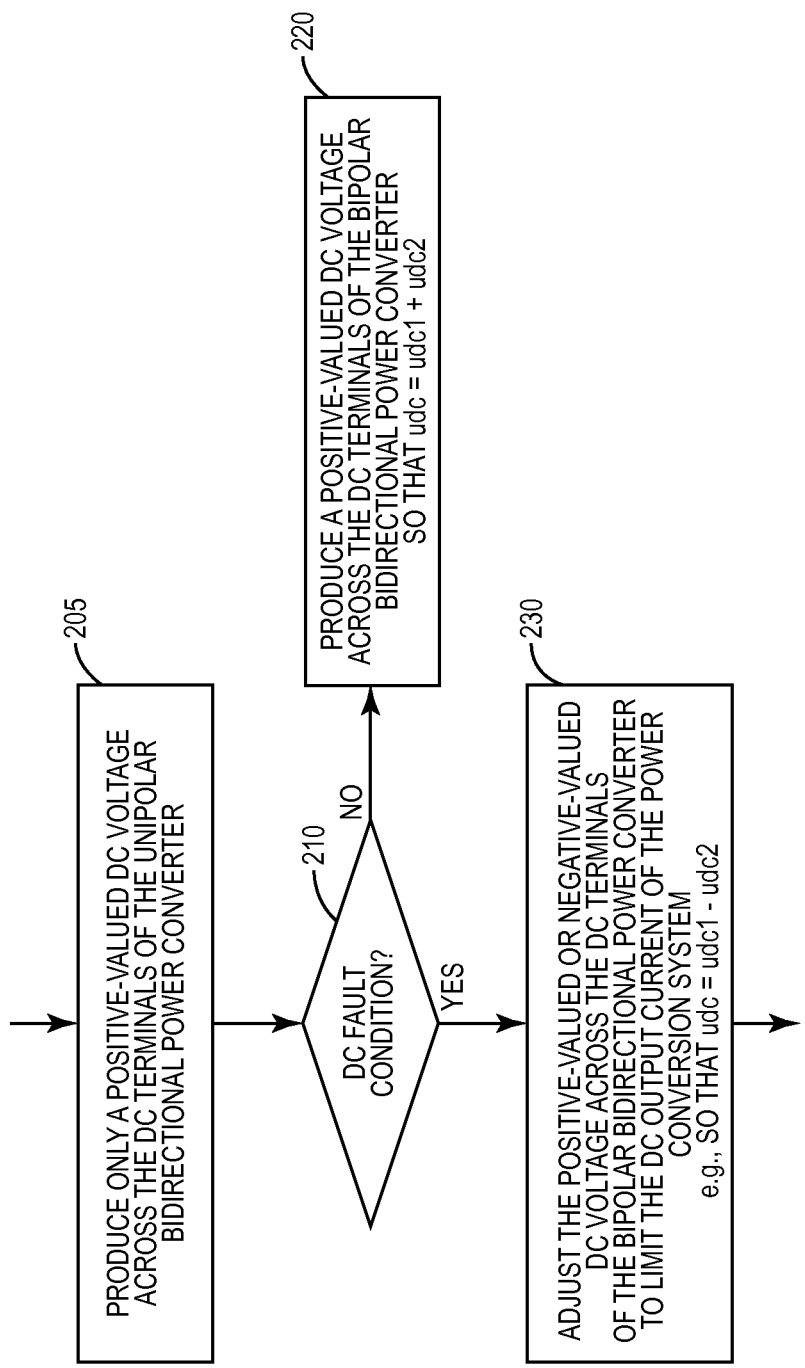
FIG. 2 illustrates a flow diagram of an embodiment of a method of limiting fault current by the bidirectional power conversion system.

The unipolar bidirectional power converter 102 has a unipolar construction. As such, the unipolar converter controller 106 causes only a positive-valued DC voltage (udc1) across the DC terminals of the unipolar bidirectional power converter 102 regardless of whether a DC fault current is present on the DC side, e.g. as shown in block 205 of FIG. 2.

In contrast, the bipolar bidirectional power converter 104 has a bipolar construction meaning the bipolar converter 104 can produce either a positive-valued or negative-valued DC voltage (udc2) across its DC terminals. That is, the output of the bipolar converter 104 can be a value between a negative-valued maximum voltage and a positive-valued maximum voltage. The bipolar converter controller 108 causes a positive-valued DC voltage across the DC terminals of the bipolar bidirectional power converter 104 when no DC fault current is present on the DC side, e.g. as shown in blocks 210 and 220 of FIG. 2. The DC terminals of the bipolar bidirectional power converter 104 are connected in series with the DC terminals of the unipolar bidirectional power converter 102 as shown in FIG. 1. This way, the total voltage (udc) of the power conversion system 100 when no DC fault current is present on the DC side is the sum of the positive-valued DC voltage across the DC terminals of the unipolar bidirectional power converter 102 and the positive-valued DC voltage across the DC terminals of the bipolar bidirectional power converter 104 as given by:

$$udc = udc1 + udc2 \qquad (1)$$

Under normal operating conditions, the values of udc1 and udc2 are each approximately equal to udc/2. If there is a short circuit DC fault, a high DC current starts to flow. In one embodiment, the bipolar converter controller 108 senses the DC fault condition e.g. by locally measuring the current and/or voltage of the bidirectional power conversion system 100. If the measured current exceeds a threshold, the bipolar converter controller 108 takes corrective action. In another embodiment, an external fault protection device detects the DC fault condition and signals the fault condition to the controller 108 included in the bipolar bidirectional power converter 104.

In either case, the corrective action taken by the bipolar converter controller 108 includes adjusting the positive-valued or negative-valued DC voltage across the DC terminals of the bipolar bidirectional power converter 104 to limit the DC output current of the power conversion system 100 responsive to a DC fault condition or other event. In one embodiment, the bipolar converter controller 108 reverses the polarity of the voltage across the DC terminals of the bipolar bidirectional power converter 104 so that the total voltage (udc) of the power conversion system 100 is forced towards zero when the polarity is reversed, e.g. as shown in blocks 210 and 230 of FIG. 2. This in turn reduces the DC fault current.

Figure 3:
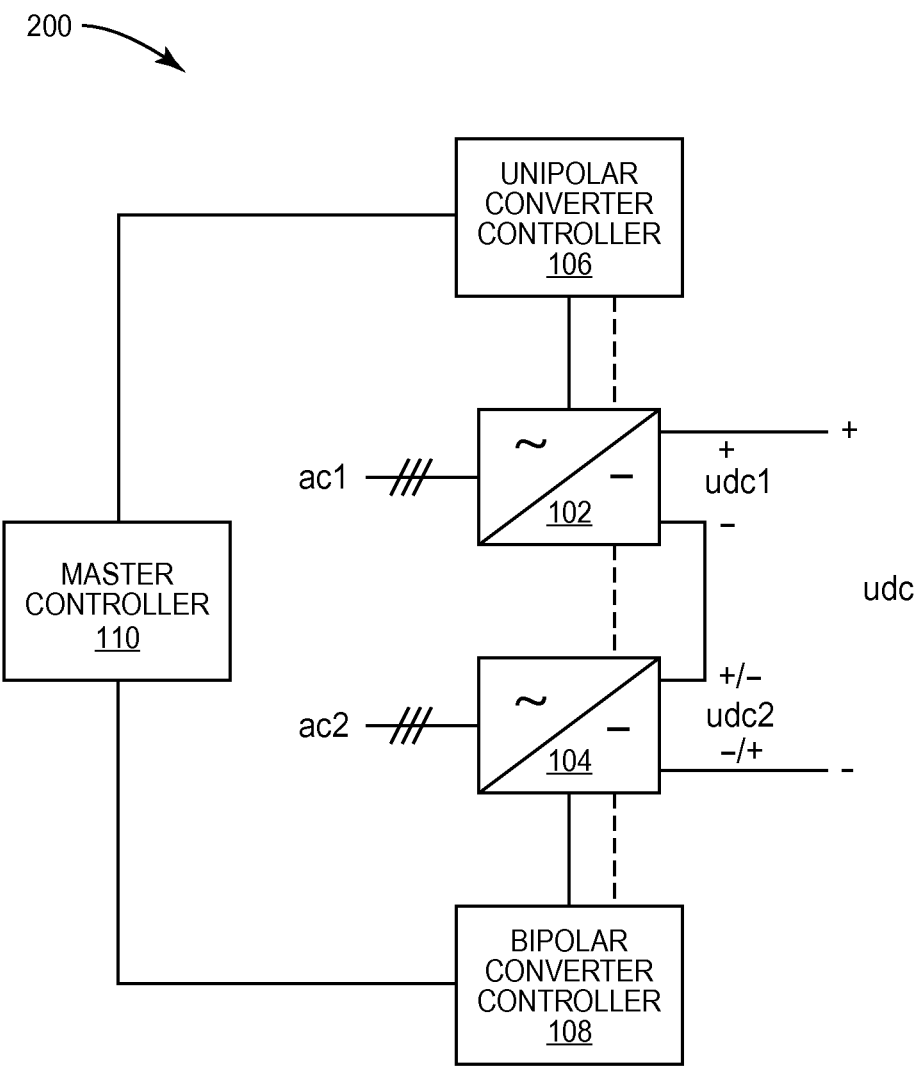
FIG. 3 illustrates a block diagram of another embodiment of the bidirectional power conversion system.

FIG. 3 illustrates another embodiment of a bidirectional power conversion system 200. According to this embodiment, the bidirectional power conversion system 200 further includes a master controller 110 for coordinating the controllers 106, 108 included in the unipolar and bipolar bidirectional power converters 102, 104. In one embodiment, the master controller 110 senses a DC fault condition e.g. by locally measuring the current and/or voltage of the bidirectional power conversion system 200. If the measured current exceeds a threshold, the master controller 110 instructs the bipolar converter controller 108 to reverse the polarity of the voltage across the DC terminals of the bipolar bidirectional power converter 104. In another embodiment, an external fault detection device detects the DC fault condition and signals the fault condition to the master controller 110 which in turns instructs the bipolar converter controller 108 to reverse the polarity of the voltage across the DC terminals of the bipolar bidirectional power converter 104. In each case, the total voltage (udc) of the power conversion system 200 is forced towards zero when the polarity of the voltage across the DC terminals of the bipolar bidirectional power converter 104 is reversed in this way, reducing the DC fault current.

In general, the converter controllers 106, 108 can be software subroutines implemented in a single physical controller. The converter controllers 106, 108 can also be separate physical controllers. For example, the unipolar converter controller 106 and the master controller 110 (if present) can be in one physical controller and the bipolar converter controller 108 in another physical controller. Alternatively, bipolar converter controller 108 and the master controller 110 (if present) can be in one physical controller and the unipolar converter controller 106 in another physical controller, etc. The master controller 110 (if provided) can be a supervisory subroutine in a single physical controller.

The AC source (ac1, ac2) connected to the AC terminals of the unipolar and bipolar bidirectional power converters 102, 104 can have different configurations. For example, the AC terminals of the unipolar bidirectional power converter 102 can be connected to a different AC power source than the AC terminals of the bipolar bidirectional power converter 104. Alternatively, the AC terminals of both converters 102, 104 can be connected to the same AC source.

Figure 4:
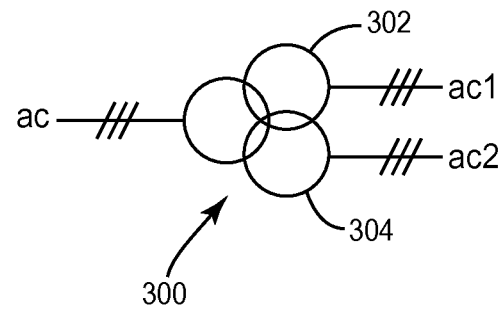
FIG. 4 illustrates a schematic diagram of an embodiment of a multi-winding transformer connecting an AC source to AC terminals of unipolar and bipolar bidirectional power converters included in the bidirectional power conversion system.

FIG. 4 illustrates an embodiment where a transformer 300 is used to connect an AC source (ac) to the AC terminals of both bidirectional power converters 102, 104. According to this embodiment, the transformer 300 is a multi-winding transformer. The AC terminals (ac1) of the unipolar bidirectional power converter 102 are connected to one winding 302 of the multi-winding transformer 302 and the AC terminals (ac2) of the bipolar bidirectional power converter 104 are connected to a different winding 304 of the transformer 300.

Figure 5:
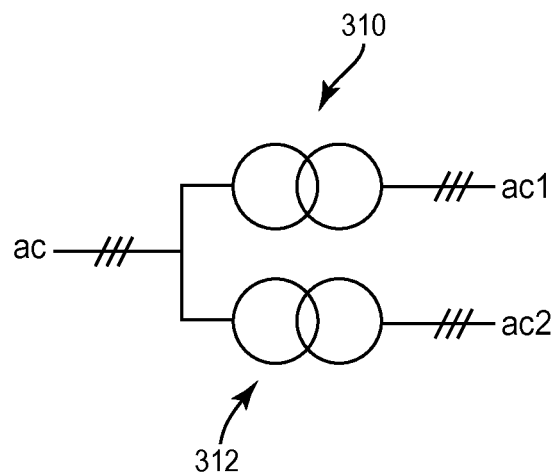
FIG. 5 illustrates a schematic diagram of an embodiment of multiple transformers connecting an AC source to AC terminals of unipolar and bipolar bidirectional power converters included in the bidirectional power conversion system.

FIG. 5 illustrates another embodiment where more than one transformer 310, 312 is used to connect an AC source (ac) to the AC terminals of both bidirectional power converters 102, 104. According to this embodiment, the AC terminals (ac1) of the unipolar bidirectional power converter 102 are connected to a first transformer 310 and the AC terminals (ac2) of the bipolar bidirectional power converter 104 are connected to a second transformer 312 different than the first transformer 310.

Figure 6:
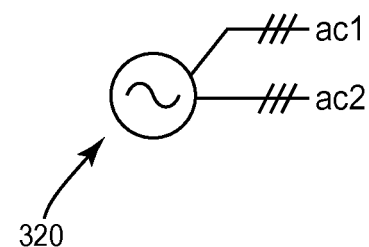
FIG. 6 illustrates a schematic diagram of an embodiment of a multi-phase source connected to AC terminals of unipolar and bipolar bidirectional power converters included in the bidirectional power conversion system.

FIG. 6 illustrates yet another embodiment where more the bidirectional power conversion system 100/200 is coupled to a multi-phase source 320. According to this embodiment, the AC terminals (ac1) of the unipolar bidirectional power converter 102 are connected to a first phase group of the multi-phase AC source 320 and the AC terminals of the bipolar bidirectional power converter 104 are connected to a second phase group of the multi-phase AC source 320 which is different than the first phase group.

The bidirectional power converters 102, 104 included in the bidirectional power conversion system 100/200 can have various constructions.

Figure 7:
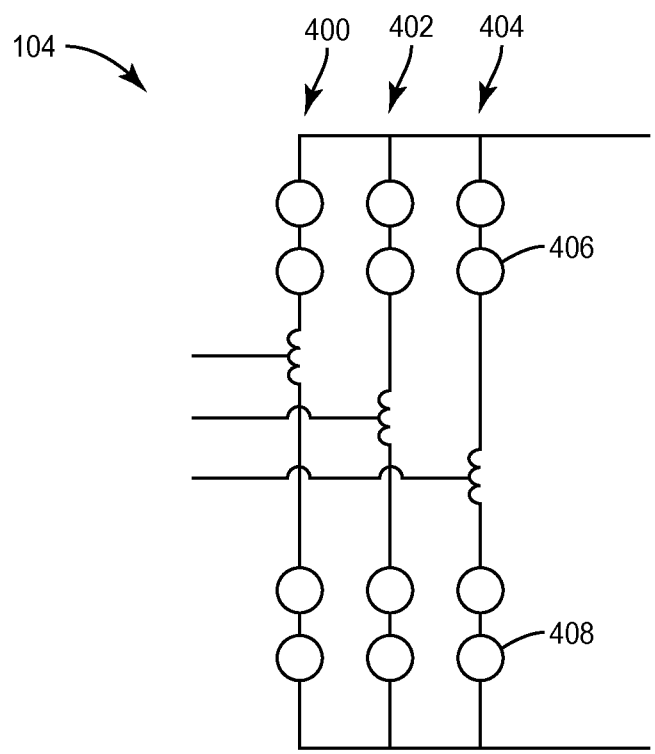
FIG. 7 illustrates a schematic diagram of an embodiment of the bipolar bidirectional power converter included in the bidirectional power conversion system.

FIG. 7 shows one embodiment of the bipolar bidirectional power converter 104. According to this embodiment, the bipolar converter 104 is a modular multi-level converter (MMC). The MMC converts between AC and DC electrical energy. The MMC has a converter leg 400, 402, 404 for each phase of the AC electrical energy. Each converter leg 400, 402, 404 has an upper arm with a first plurality of bipolar modules 406 and a lower arm with a second plurality of bipolar modules 408. Each bipolar module 406, 408 functions as a controlled voltage source.

Figure 8:
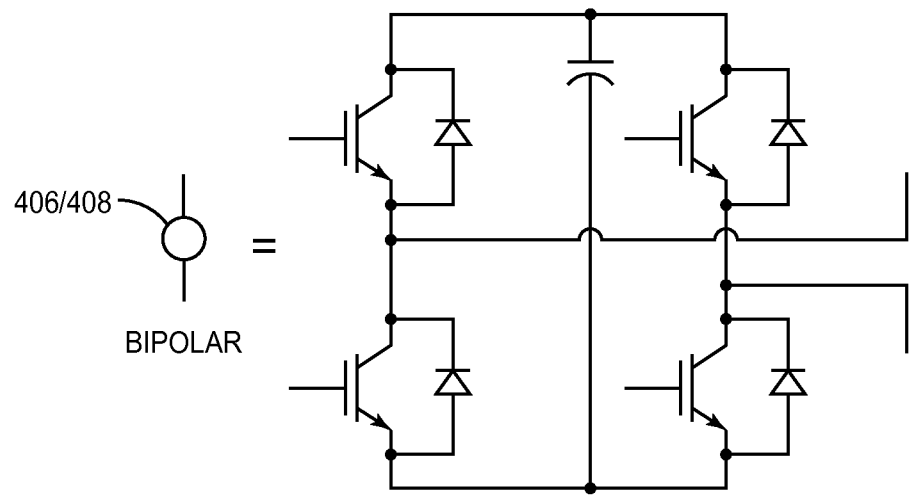
FIG. 8 illustrates a schematic diagram of an embodiment of bipolar modules used to construct the bipolar bidirectional power converter included in the bidirectional power conversion system.

FIG. 8 illustrates an embodiment of the bipolar modules 406/408 used to construct the bipolar bidirectional power converter 104 included in the MMC shown in FIG. 7. Each bipolar module 406/408 of the bipolar bidirectional power converter 104 includes power transistors connected in a full-bridge configuration in parallel with a DC capacitor. Each power transistor is coupled in parallel with a freewheeling diode.

The unipolar bidirectional power converter 102 connected in series with the MMC shown in FIG. 7 can be similarly constructed of unipolar modules 500. In one embodiment, the unipolar modules 500 form a boost rectifier.

Figure 9:
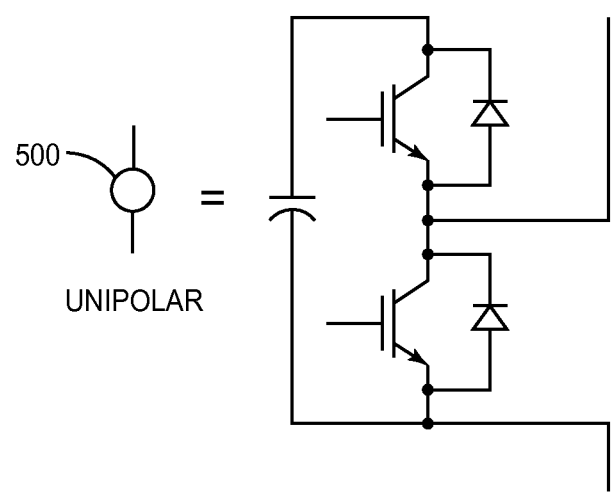
FIG. 9 illustrates a schematic diagram of an embodiment of unipolar modules used to construct the unipolar bidirectional power converter included in the bidirectional power conversion system.

FIG. 9 illustrates an embodiment of the unipolar modules 500 used to implement the unipolar bidirectional power converter 102 as a boost rectifier. Each unipolar module 500 includes power transistors connected in a half-bridge configuration in parallel with a DC capacitor. Each power transistor is coupled in parallel with a freewheeling diode.

Figure 10:
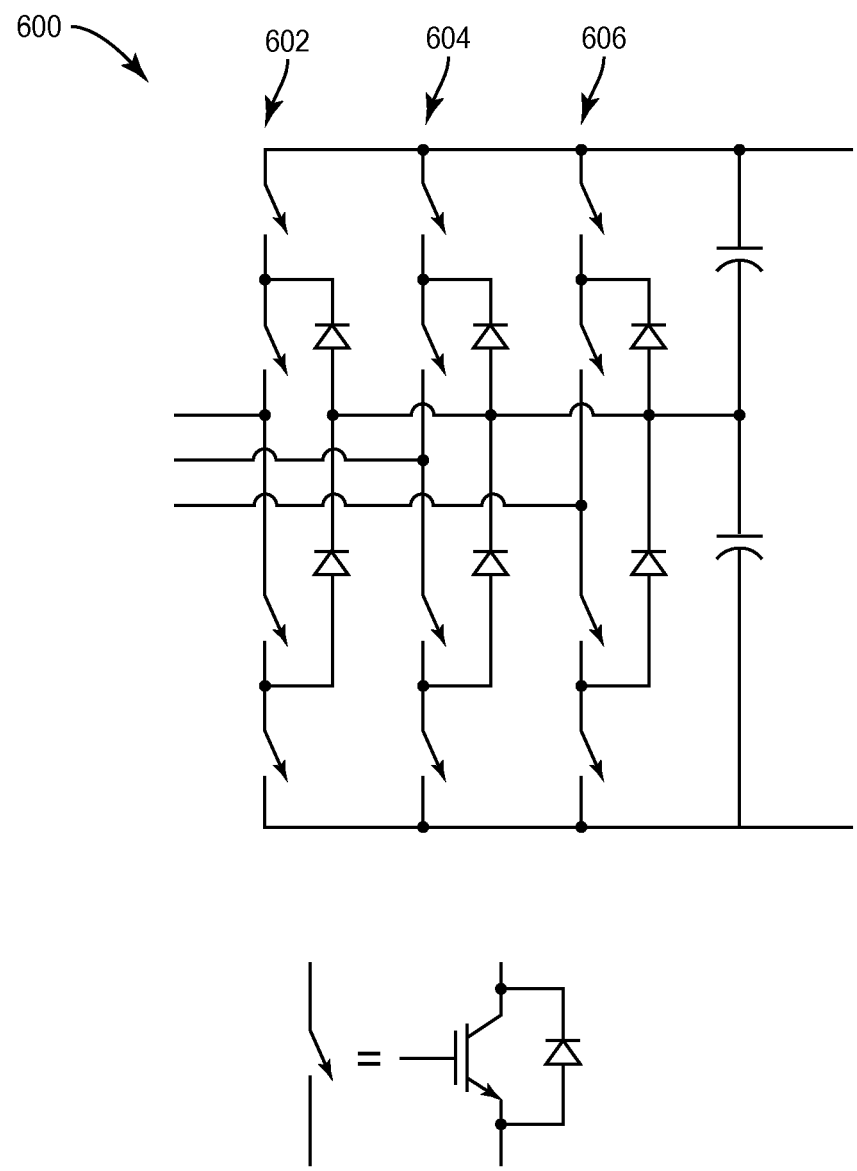
FIG. 10 illustrates a schematic diagram of another embodiment of the unipolar modules.

FIG. 10 illustrates an embodiment of the unipolar bidirectional power converter 102 implemented as a boost rectifier 600. According to this embodiment, the boost rectifier 600 is a neutral-point clamped (NPC) multilevel converter which includes a plurality of power switches and power diodes in each phase leg 602, 604, 606 of the boost rectifier 600. The switches can be implemented as power transistors coupled in parallel with a freewheeling diode as schematically indicated in the bottom part of FIG. 10. DC capacitors are also provided at the DC side.

Figure 11:
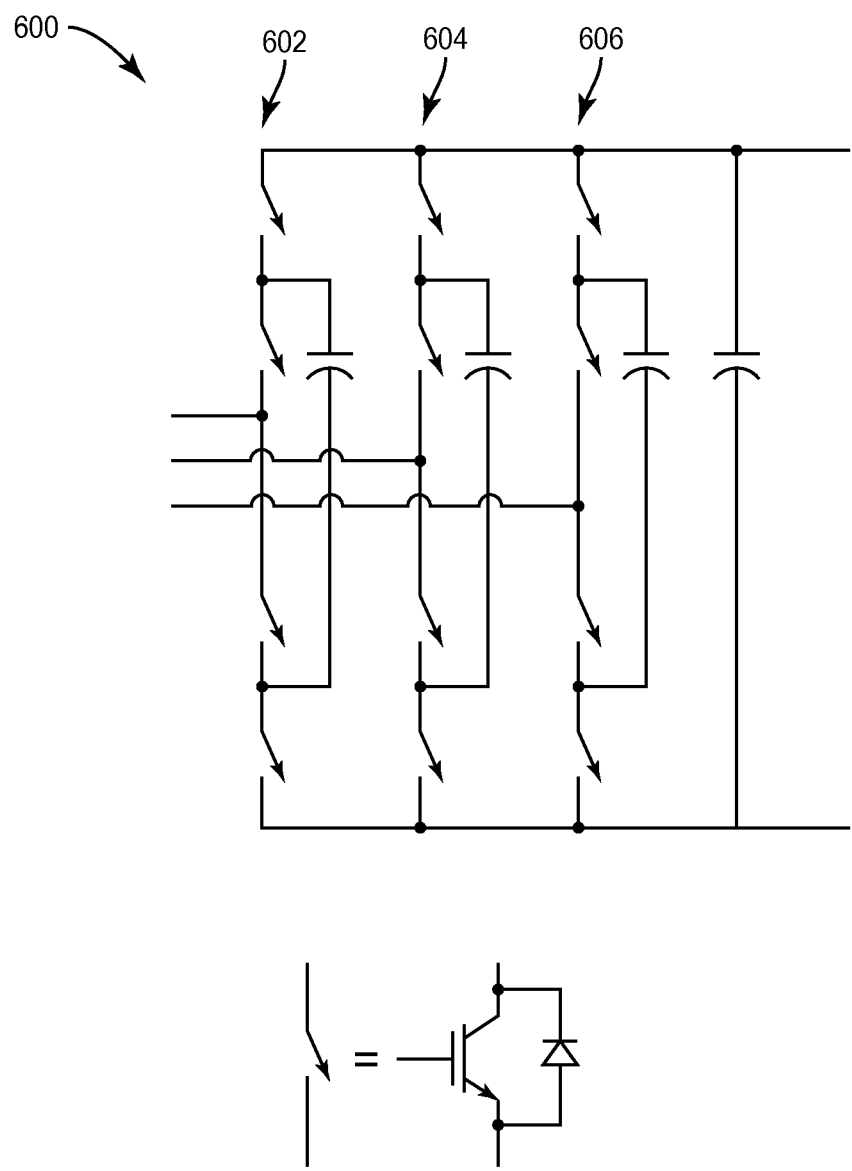
FIG. 11 illustrates a schematic diagram of yet another embodiment of the unipolar modules.

FIG. 11 illustrates yet another embodiment of the unipolar bidirectional power converter 102 implemented as a boost rectifier 600. According to this embodiment, the boost rectifier 600 is a flying capacitor (FC) multilevel converter which includes a plurality of power switches and DC capacitors in each phase leg 602, 604, 606 of the boost rectifier 600. The switches can be implemented as power transistors coupled in parallel with a freewheeling diode as schematically indicated in the bottom part of FIG. 11. An additional DC capacitor is provided at the DC side.

Figure 12:
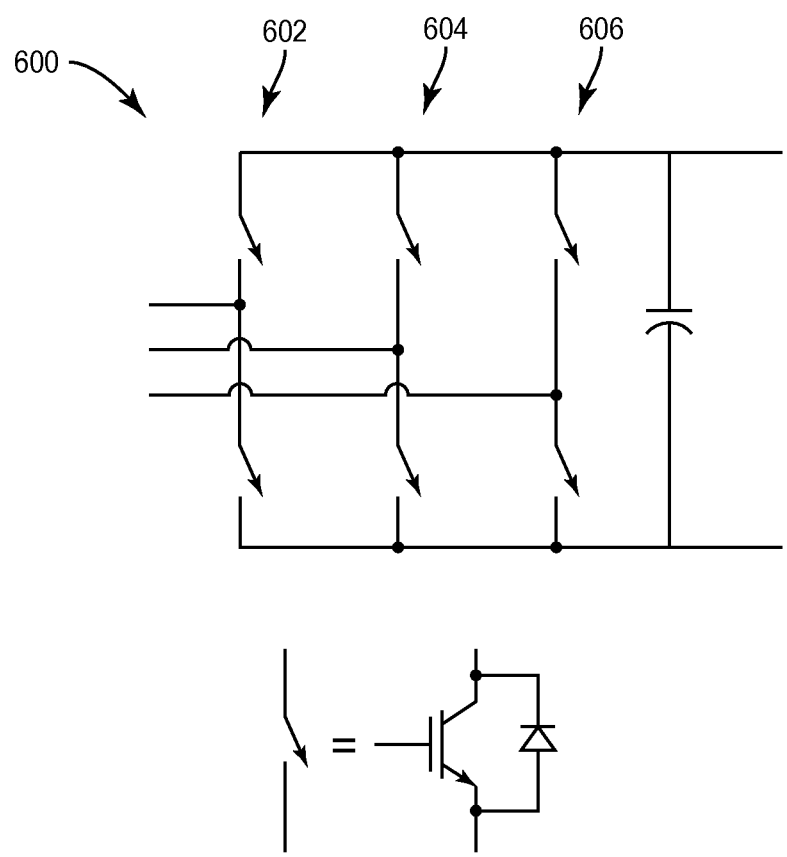
FIG. 12 illustrates a schematic diagram of still another embodiment of the unipolar modules.

FIG. 12 illustrates still another embodiment of the unipolar bidirectional power converter 102 implemented as a boost rectifier 600. According to this embodiment, the boost rectifier 600 is a two-level converter with a dc capacitor. The boost rectifier 600 includes a plurality of power switches in each phase leg 602, 604, 606 of the boost rectifier 600. The switches can be implemented as power transistors coupled in parallel with a freewheeling diode as schematically indicated in the right-hand part of FIG. 12. A DC capacitor is provided at the DC side.

Figure 13:
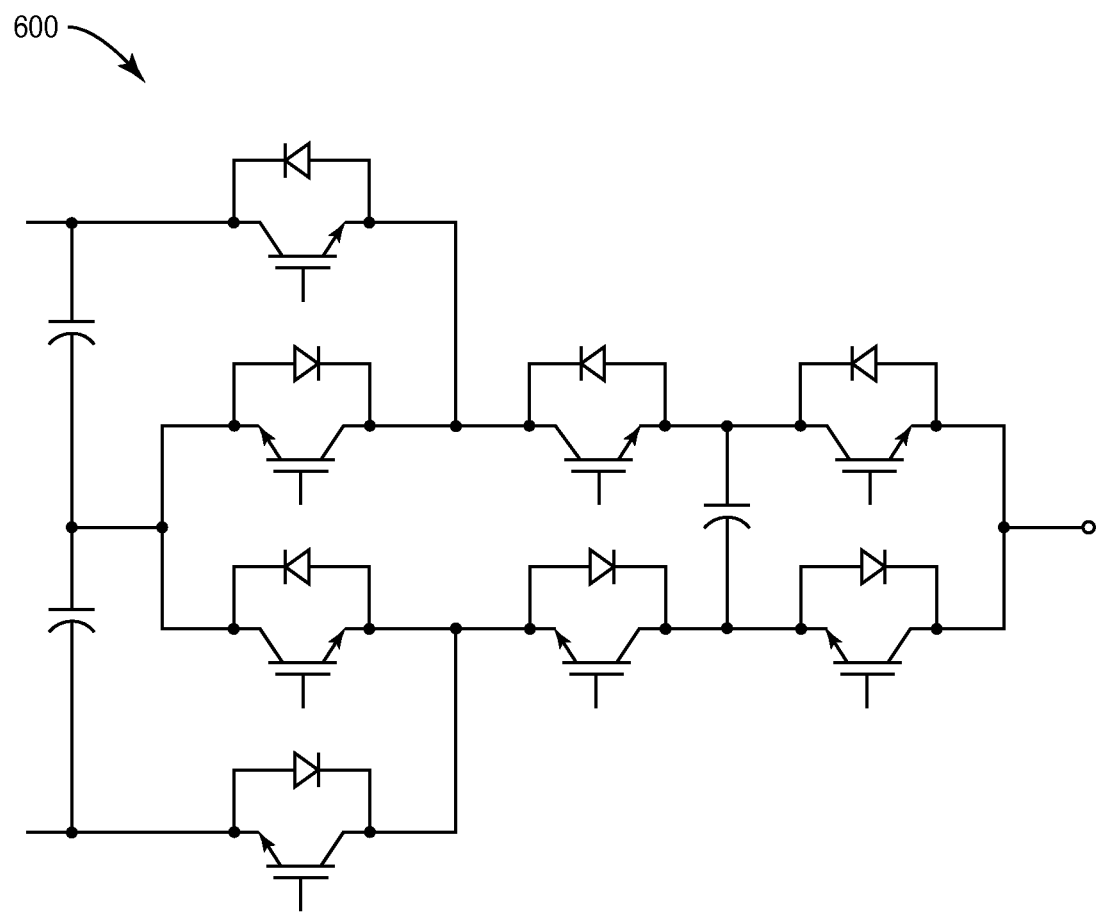
FIG. 13 illustrates a schematic diagram of another embodiment of the unipolar modules.

FIG. 13 illustrates another embodiment of the unipolar bidirectional power converter 102 implemented as a boost rectifier 600. According to this embodiment, the boost rectifier 600 is a hybrid (NPC+FC) multilevel converter. A single phase leg is shown in FIG. 13, which includes a plurality of power transistors coupled in parallel with freewheeling diodes. DC capacitors are provided at the AC and DC side.

The unipolar bidirectional power converter 102 connected in series with the MMC shown in FIG. 7 can be constructed as a buck rectifier instead of a boost rectifier.

Figure 14:
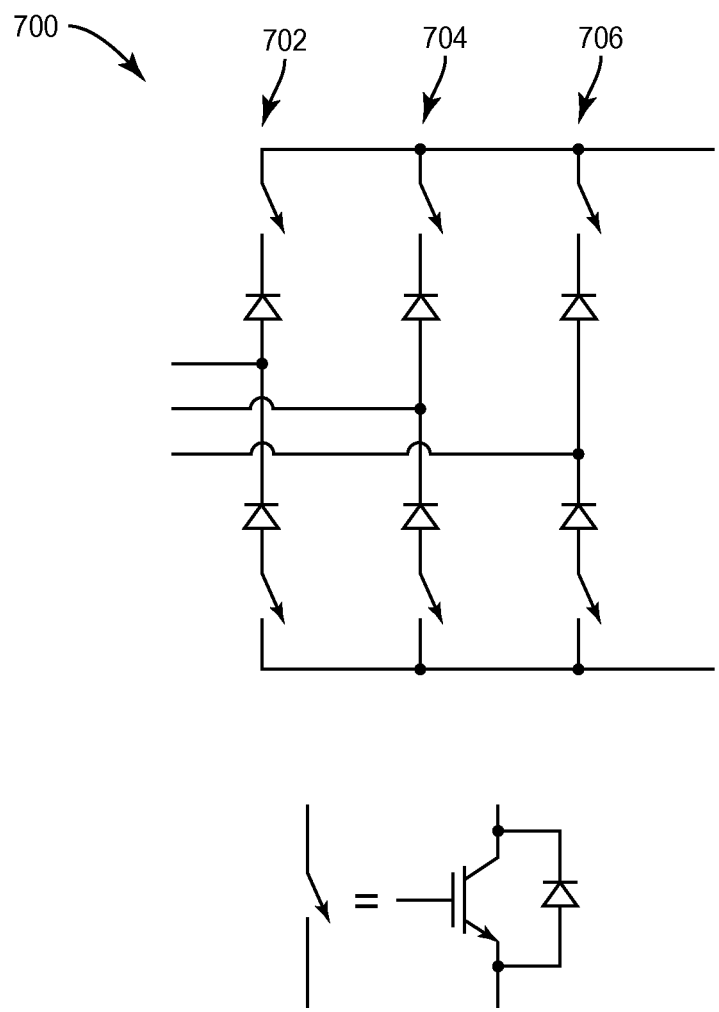
FIG. 14 illustrates a schematic diagram of an embodiment of the unipolar modules implemented as a buck rectifier.

FIG. 14 illustrates an embodiment of the unipolar bidirectional power converter 102 implemented as a buck rectifier 700. According to this embodiment, each phase leg 702, 704, 706 of the buck rectifier 700 includes power switches in series with power diodes. The switches can be implemented as power transistors as schematically indicated in the right-hand part of FIG. 14. No filter elements of the buck rectifier 700 are shown in FIG. 14 for ease of illustration.

In general, the bidirectional power conversion system 100/200 described herein can be used as an interface between various types of AC and DC networks, for providing fault current limiting capabilities. The bidirectional power conversion system 100/200 can function as an inverter by changing DC power to AC power, or as a converter by changing AC power to DC power.

Figure 15:
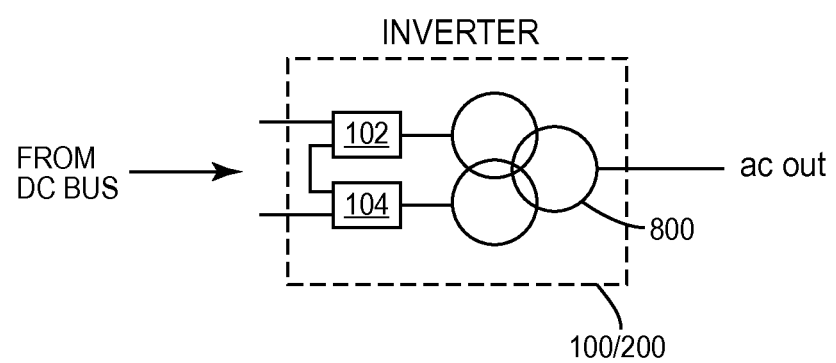
FIG. 15 illustrates a schematic diagram of an embodiment of the bidirectional power conversion system used as an inverter.

FIG. 15 illustrates an embodiment of the bidirectional power conversion system 100/200 used as an inverter. The inverter changes the rectified or DC output of a generator from a DC bus into an AC output. The unipolar and bipolar bidirectional power converters 102, 104 included in the inverter can be coupled to the generator via a DC bus on the DC side, and to an AC bus or grid by a transformer 800 on the AC side.

Figure 16:
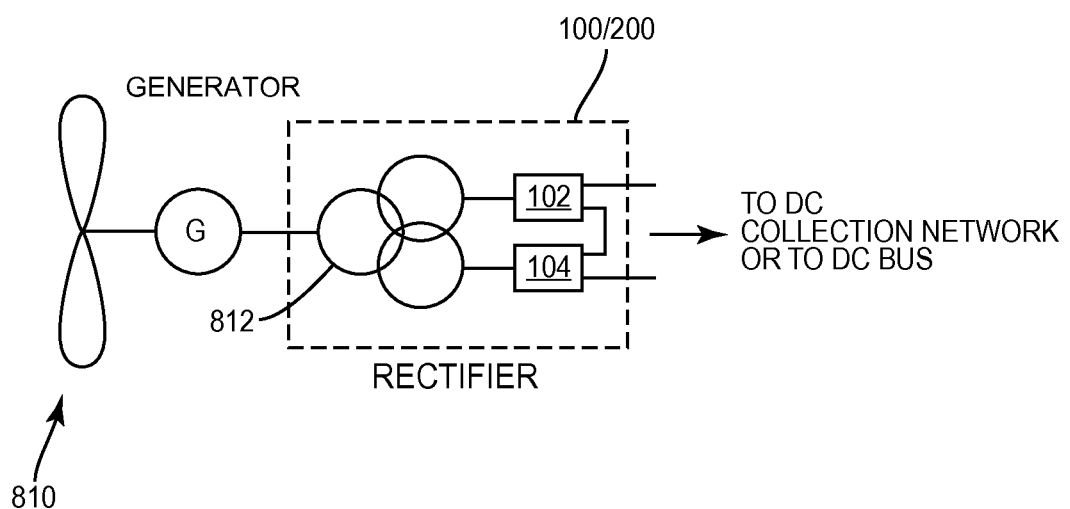
FIG. 16 illustrates a schematic diagram of an embodiment of the bidirectional power conversion system used as a rectifier.

FIG. 16 illustrates an embodiment of the bidirectional power conversion system 100/200 used as a rectifier. The rectifier converts the variable frequency output of a generator (G) into DC. The generator is driven by a turbine 810 such as a wind or wave turbine. The unipolar and bipolar bidirectional power converters 102, 104 included in the rectifier can be connected to the generator by a transformer 812 on the AC side. The DC side is connected to a DC collection network or DC bus.

Figure 17:
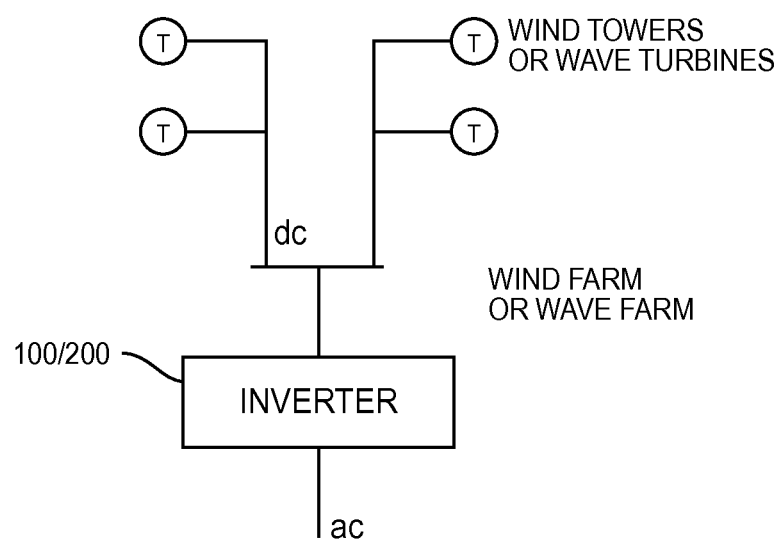
FIG. 17 illustrates a schematic diagram of an embodiment of a wind or wave energy farm including the bidirectional power conversion system used as an inverter.

FIG. 17 illustrates a wind or wave energy farm with DC energy collection. The bidirectional power conversion system 100/200 is used as an inverter according to this embodiment. The energy farm includes several turbines (T) such as wind tower turbines or wave turbines connected to a DC bus. The inverter changes the DC power from the DC bus into an AC output.

Figure 18:
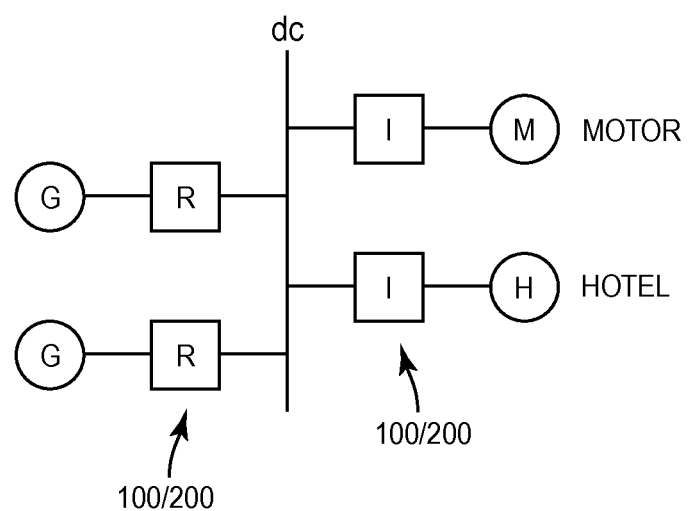
FIG. 18 illustrates a schematic diagram of an embodiment of a shipboard DC distribution system including the bidirectional power conversion system used as a rectifier or inverter.

FIG. 18 illustrates a shipboard DC distribution system which includes generators (G), rectifiers (R), inverters (I), and AC loads such as a motor (M) and/or hotel electrical demand (H) for the hotel portion of the ship. The bidirectional power conversion system 100/200 can be used as the rectifiers for converting the variable frequency output of the generators into DC, or as the inverters for inverting the power on the DC bus into variable frequency AC for the AC loads.

Figure 19:
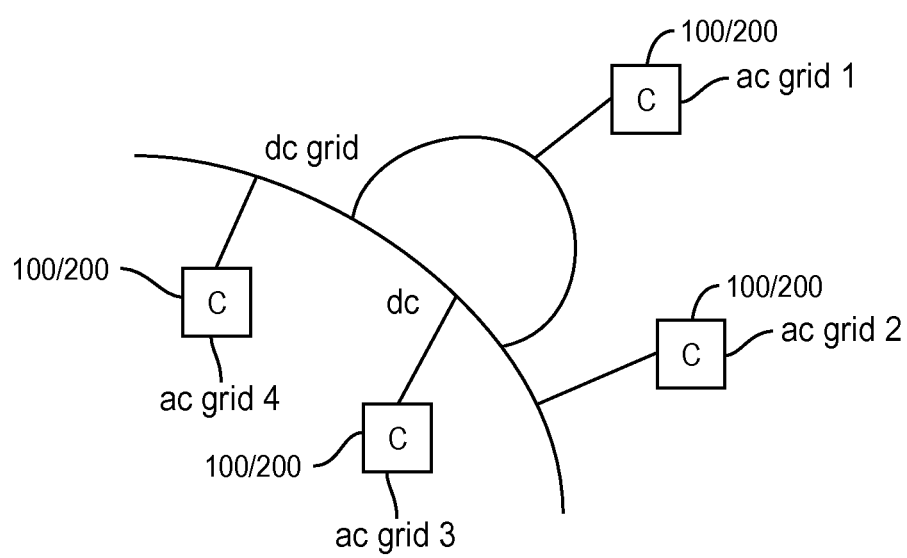
FIG. 19 illustrates a schematic diagram of an embodiment of a DC grid including the bidirectional power conversion system used as a converter for interfacing the DC grid to an AC grid.

FIG. 19 illustrates an embodiment of a DC grid. The bidirectional power conversion system 100/200 described herein is used as a converter (C) for interfacing the DC grid to an AC grid.

In general, each of the bidirectional power converters 102, 104 included in the bidirectional power conversion system 100/200 has an AC side and a DC side as previously described herein, and each side of each converter 102, 104 has a current and a voltage associated with it. Thus, each bidirectional power converter 102, 104 has four variables associated with it: AC current; AC voltage; DC current; and DC voltage. Of these four variables, at least two can be externally imposed and two regulated.

As an example, the DC voltage and the AC voltage may be externally imposed e.g. by a collection grid and a wind turbine generator, respectively, and the corresponding currents may be regulated by the bidirectional power conversion system 100/200. As another example, the DC current and the AC voltage may be externally imposed e.g. by a wind park and a transmission grid, respectively, and the DC voltage and the AC current may be regulated by the bidirectional power conversion system 100/200.

Figure 20:
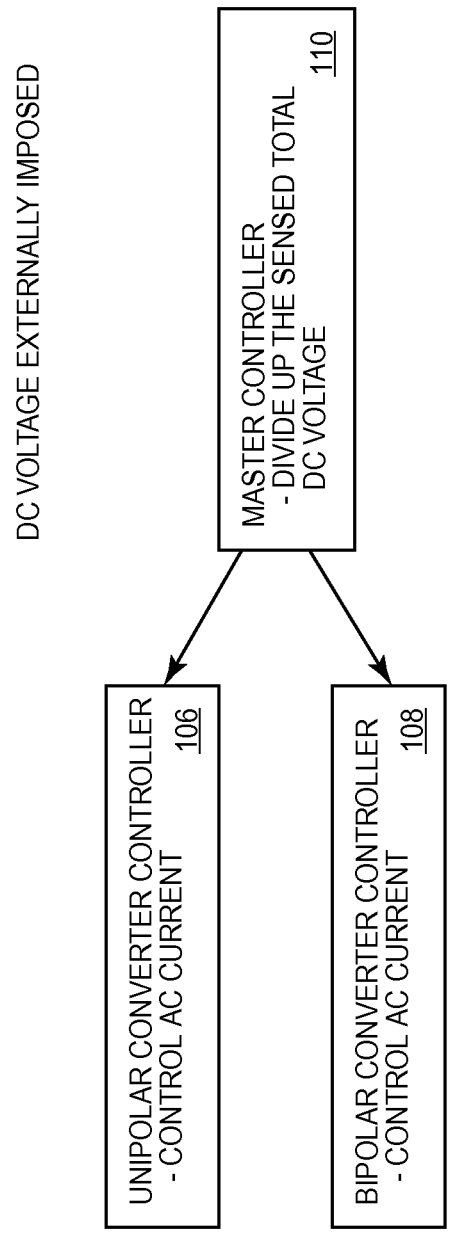
FIG. 20 illustrates a schematic diagram of an embodiment of a master controller providing the individual converter controllers with information based on DC voltage information.
Figure 21:
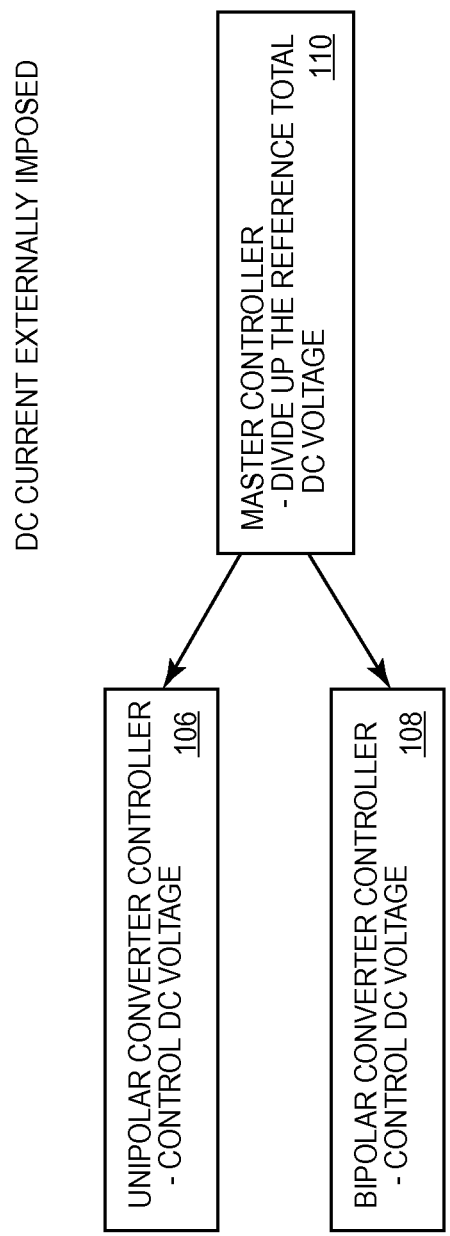
FIG. 21 illustrates a schematic diagram of an embodiment of the master controller providing the individual converter controllers with references for individual DC voltages.

In addition to the individual controllers 106, 108 associated with the bidirectional power converters 102, 104 included in the bidirectional power conversion system 100/200, the master controller 110 can be used to coordinate the individual converters 106, 108 (whose DC outputs are in series). The master controller 110 ensures that the voltage is properly divided between the unipolar and bipolar bidirectional power converters 102, 104. In one embodiment, the master controller 110 provides the individual converter controllers 106, 108 with DC voltage information e.g. such as the sensed total DC voltage in case the total DC voltage is externally imposed as shown in FIG. 20. In another embodiment, the master controller 110 provides the individual converter controllers 106, 108 with references for the individual DC voltages in case the total DC voltage is to be regulated as shown in FIG. 21. In either case, the DC voltage information provided by the master controller 110 ensures the externally imposed conditions are met by the unipolar and bipolar bidirectional power converters 102, 104. Also, the local converter controllers 106, 108 can regulate at least two of AC current, AC voltage, DC current, and DC voltage based on the DC voltage information provided by the master controller 110.

Figure 22:
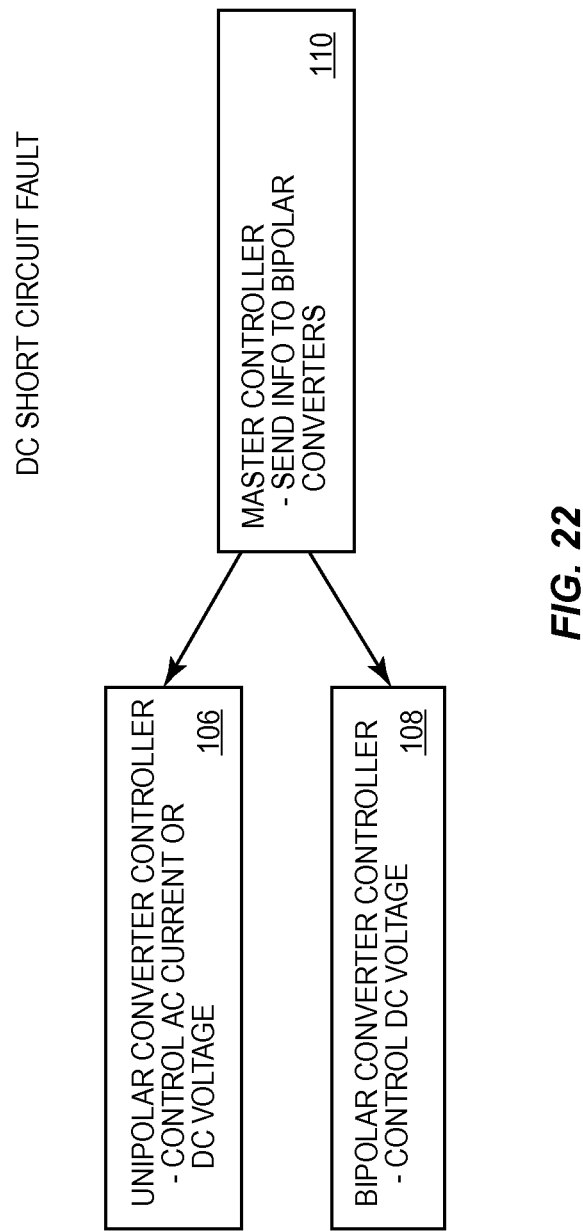
FIG. 22 illustrates a schematic diagram of an embodiment of the master controller commanding the bipolar bidirectional power converter to reverse its polarity and output negative DC voltage in response to a DC short circuit fault.

Further, the master controller 110 either observes a fault by processing the sensed voltages and currents or receives fault information from a separate fault detection device. In case of a DC short circuit fault, the master controller 110 commands the bipolar bidirectional power converter 104 to reverse its polarity and output negative DC voltage as shown in FIG. 22. Since the unipolar bidirectional power converter 102 continues to output positive DC voltage, the total DC voltage tends towards zero, thereby reducing the current fed into the DC fault as previously described herein.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A power conversion system, comprising:
   a unipolar bidirectional power converter including DC output terminals and a first controller operable to cause only a positive-valued DC voltage across the DC output terminals; and
   a bipolar bidirectional power converter including DC output terminals connected in series with the DC output terminals of the unipolar bidirectional power converter and a second controller operable to cause a positive-valued or negative-valued DC voltage across the DC output terminals of the bipolar bidirectional power converter so that a total voltage of the power conversion system is the sum of the positive-valued or negative-valued DC voltage across the DC output terminals of the bipolar bidirectional power converter and the positive-valued DC voltage across the DC output terminals of the unipolar bidirectional power converter,
   wherein the second controller is further operable to sense a DC fault condition and reverse the polarity of the voltage across the DC output terminals of the bipolar bidirectional power converter in response so that the total voltage of the power conversion system is forced towards zero when the polarity is reversed, or reverse the polarity of the voltage across the DC output terminals of the bipolar bidirectional power converter responsive to a signal received by the bipolar bidirectional power converter which indicates the DC fault condition.

2. The power conversion system according to claim 1, wherein the second controller is further operable to adjust the positive-valued or negative-valued DC voltage across the DC output terminals of the bipolar bidirectional power converter to limit a DC output current of the power conversion system.

3. The power conversion system according to claim 1, further comprising a master controller operable to coordinate operation of the first and second controllers.

4. The power conversion system according to claim 3, wherein the master controller is further operable to receive a signal which indicates the DC fault condition and in response send a signal to the second controller indicating the DC fault condition.

5. The power conversion system according to claim 1, wherein AC input terminals of the unipolar bidirectional power converter are connected to a different AC power source than AC input terminals of the bipolar bidirectional power converter.

6. The power conversion system according to claim 1, wherein AC input terminals of the unipolar bidirectional power converter are connected to one of a different winding of a multi-winding transformer than AC input terminals of the bipolar bidirectional power converter, a different transformer than AC input terminals of the bipolar bidirectional power converter, or a different phase group of a multi-phase AC source than AC input terminals of the bipolar bidirectional power converter.

7. The power conversion system according to claim 1, wherein the bipolar bidirectional power converter is a modular multi-level converter including full bridge bipolar modules.

8. The power conversion system according to claim 7, wherein the unipolar bidirectional power converter is a boost rectifier or a buck rectifier.

9. The power conversion system according to claim 8, wherein the boost rectifier is one of a modular multi-level converter with half bridge unipolar modules, a neutral-point clamped multi-level converter, a flying capacitor multi-level converter, a two-level converter with a DC capacitor, or a neutral-point clamped multi-level converter and a flying capacitor multi-level converter.

10. The power conversion system according to claim 1, wherein the unipolar bidirectional power converter and the bipolar bidirectional power converter are operable to convert a variable frequency generator output into DC power, convert a DC generator output into AC power, convert a DC bus output into AC power, or provide an interface between a DC grid and an AC grid.

11. The power conversion system according to claim 1, wherein the unipolar bidirectional power converter and the bipolar bidirectional power converter each have a DC current and a DC voltage associated with the DC output terminals of the respective converters, and an AC current and an AC voltage associated with AC input terminals of the respective converters, and wherein at least two of the DC current, the DC voltage, the AC current and the AC voltage are regulated.

12. The power conversion system according to claim 11, further comprising a master controller operable to provide DC voltage information received from a sensor to the unipolar and bipolar bidirectional power converters, and wherein the first and second controllers are further operable to regulate the at least two of the DC current, the DC voltage, the AC current and the AC voltage based on the information provided by the master controller.

13. A method of operating a power conversion system including a unipolar bidirectional power converter having a first controller and DC output terminals, and a bipolar bidirectional power converter having a second controller and DC output terminals connected in series with the DC output terminals of the unipolar bidirectional power converter, the method comprising:
  outputting only a positive-valued DC voltage across the DC output terminals of the unipolar bidirectional power converter under control by the first controller;
  outputting a positive-valued or negative-valued DC voltage across the DC output terminals of the bipolar bidirectional power converter under control by the second controller so that a total voltage of the power conversion system is the sum of the positive-valued or negative-valued DC voltage across the DC output terminals of the bipolar bidirectional power converter and the positive-valued DC voltage across the DC output terminals of the unipolar bidirectional power converter; and
  sensing a DC fault condition and reversing the polarity of the voltage across the DC output terminals of the bipolar bidirectional power converter in response so that the total voltage of the power conversion system is forced towards zero when the polarity is reversed, or reversing the polarity of the voltage across the DC output terminals of the bipolar bidirectional power converter responsive to a signal received by the bipolar bidirectional power converter which indicates the DC fault condition.

14. The method according to claim 13, further comprising adjusting the positive-valued or negative-valued DC voltage across the DC output terminals of the bipolar bidirectional power converter under control by the second controller to limit a DC output current of the power conversion system.

15. The method according to claim 13, further comprising coordinating operation of the first and second controllers via a master controller.

16. The method according to claim 13, wherein the unipolar bidirectional power converter and the bipolar bidirectional power converter each have a DC current and a DC voltage associated with the DC output terminals of the respective converters, and an AC current and an AC voltage associated with AC input terminals of the respective converters, the method further comprising regulating at least two of the DC current, the DC voltage, the AC current and the AC voltage.

17. The method according to claim 16, further comprising:
  providing DC voltage information from a master controller to the first and second controllers; and
  regulating the at least two of the DC current, the DC voltage, the AC current and the AC voltage based on the information provided by the master controller.

18. A power conversion system, comprising:
  a unipolar bidirectional power converter including DC output terminals and a first controller operable to cause only a positive-valued DC voltage across the DC output terminals;
  a bipolar bidirectional power converter including DC output terminals connected in series with the DC output terminals of the unipolar bidirectional power converter and a second controller operable to cause a positive-valued or negative-valued DC voltage across the DC output terminals of the bipolar bidirectional power converter so that a total voltage of the power conversion system is the sum of the positive-valued or negative-valued DC voltage across the DC output terminals of the bipolar bidirectional power converter and the positive-valued DC voltage across the DC output terminals of the unipolar bidirectional power converter; and
  a master controller operable to sense a DC fault condition and in response send a signal to the second controller indicating the DC fault condition, or receive a signal which indicates the DC fault condition and in response send a signal to the second controller indicating the DC fault condition.

* * * * *